(12) United States Patent
Long

(10) Patent No.: US 11,470,812 B2
(45) Date of Patent: Oct. 18, 2022

(54) TOOL FOR PROVIDING NOURISHMENT TO PETS

(71) Applicant: Philip Andrew Long, Doral, FL (US)

(72) Inventor: Philip Andrew Long, Doral, FL (US)

( * ) Notice: Subject to any disclaimer, the term of this patent is extended or adjusted under 35 U.S.C. 154(b) by 194 days.

(21) Appl. No.: 17/074,616

(22) Filed: Oct. 19, 2020

(65) Prior Publication Data

US 2021/0112774 A1 Apr. 22, 2021

Related U.S. Application Data

(60) Provisional application No. 62/923,175, filed on Oct. 18, 2019.

(51) Int. Cl.
*A01K 5/02* (2006.01)
*G05B 19/4155* (2006.01)
*A61D 99/00* (2006.01)

(52) U.S. Cl.
CPC ........ *A01K 5/0283* (2013.01); *G05B 19/4155* (2013.01); *A61D 99/00* (2013.01); *G05B 2219/2645* (2013.01)

(58) Field of Classification Search
CPC .... A01K 39/0113; A01K 5/02; A01K 5/0225; A01K 61/80

USPC ....... 119/51.01, 52.3, 53, 57.9, 57.91, 57.92, 119/908
See application file for complete search history.

(56) References Cited

U.S. PATENT DOCUMENTS

| | | | | |
|---|---|---|---|---|
| 4,565,159 A | * | 1/1986 | Sweeney | A01K 61/80 119/57.91 |
| 5,471,951 A | * | 12/1995 | Collins | A01K 39/0113 119/908 |
| 2014/0267705 A1 | * | 9/2014 | Hankins | A01K 5/02 119/51.01 |

* cited by examiner

*Primary Examiner* — Yvonne R Abbott-Lewis
(74) *Attorney, Agent, or Firm* — Mark Terry

(57) ABSTRACT

A system for providing nourishment to pets is provided. The system includes a base component and an electrically operated platform including a scale configured to move along one or more vertical shafts which brings one or more reservoirs positioned on the platform to various levels of height. The system further includes an affixed mount configured to retain a computing device which controls components of the system, particularly the movement of the platform along the one or more vertical shafts and the taking and storage of weight data of the nourishment.

16 Claims, 4 Drawing Sheets

TOOL FOR PROVIDING NOURISHMENT TO PETS

CROSS-REFERENCE TO RELATED APPLICATIONS

This patent application claims priority to provisional patent application No. 62/923,175 filed Oct. 18, 2019 and entitled "Tool for Providing Nourishment to Pets". Application No. 62/923,175 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to owning and caring for pets, more specifically, to providing nourishment to pets.

BACKGROUND

It is well known that owning and caring for pet animals is not only a time-consuming process, but also one that may include an exorbitant amount of labor especially pertaining to placing and retrieving food, water, and medicine for the animal at the floor level on a daily basis. An inherent issue to this process is the significant amount of stress and aches endured by the pet owner due to bending over to place and retrieve the bowls from the floor, in addition to the lack of means for accommodation if the pet owner is not physically able to bend over to place and retrieve the bowls altogether. Another issue is the pet owner having to repeat this process if the initial amount of food or water added to the bowl is not the desired or suggested amount for the pet.

An additional issue associated with this process is the inability for the pet owner to be able to simultaneously weigh the portions provided to the pet, and subsequently automate the entire arduous process of providing nourishment to the pet on a daily and in some cases twice a day basis. Furthermore, owning and caring for a pet requires a significant number of additional tasks such as additional research relating to the respective pet, scheduling veterinarian appointments, grooming appointments, or caretaking arrangements for when the pet owner will not be present. Current systems such as feeding stations do not provide the functionality that allows the pet owner to accomplish all pet-related tasks in one centralized location in a single moment.

Therefore, a need exists for improvements over the prior art, and more particularly for systems that provide nourishment for pets along with automation of other common tasks associated with caring for and owning pets that do not involve time-consuming and labor intensive tasks performed by the pet owner.

SUMMARY

A system for providing nourishment to pets is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for providing nourishment to pets is provided that solves the above-described problems. The system includes a base component configured to provide a foundation; at least one vertical shaft affixed to the base component; a slidable platform coupled to the at least one vertical shaft; at least one reservoir configured to be positioned on the slidable platform, the at least one reservoir for holding nourishment for a pet; a motor configured to power vertical movement of the slidable platform along the vertical shaft; a scale mechanism configured for weighing the nourishment in the at least one reservoir, thereby producing weight data for the nourishment; a computing device communicatively coupled to the motor and the scale mechanism, wherein the computing device is configured to read weight data from the scale mechanism and store said weight data, and wherein the computing device is configured to activate and deactivate the motor, so as to move the slidable platform along the vertical shaft; and a mount affixed to the at least one vertical shaft, the mount configured to couple to the computing device in a viewing position.

In another embodiment, a system for providing nourishment to pets is provided that solves the above-described problems. The system includes a base component configured to provide a foundation; at least one vertical shaft affixed to the base component; a slidable platform coupled to the at least one vertical shaft; at least one reservoir configured to be positioned on the slidable platform, the at least one reservoir for holding nourishment for a pet; a motor configured to power vertical movement of the slidable platform along the vertical shaft; a scale mechanism configured for weighing the nourishment in the at least one reservoir, thereby producing weight data for the nourishment; a computing device communicatively coupled to the motor and the scale mechanism, wherein the computing device is configured to read weight data from the scale mechanism, store said weight data, activate the motor in a first mode, so as to move the slidable platform upwards along the vertical shaft, activate the motor in a second mode, so as to move the slidable platform downwards along the vertical shaft; and deactivate the motor when the slidable platform has reached the desired height; and a mount affixed to the at least one vertical shaft, the mount configured to couple to the computing device in a viewing position.

As described herein, nourishment may include but is not limited to any food, water, treats, antibiotics, antiparasitic, antifungals, steroids, pain relievers, topicals, ointments, or any other applicable substances configured to be dispensed to and subsequently ingested by pets.

These and other objects, features, and advantages of the present invention will become more readily apparent from the attached drawings and the detailed description of the preferred embodiments, which follow.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
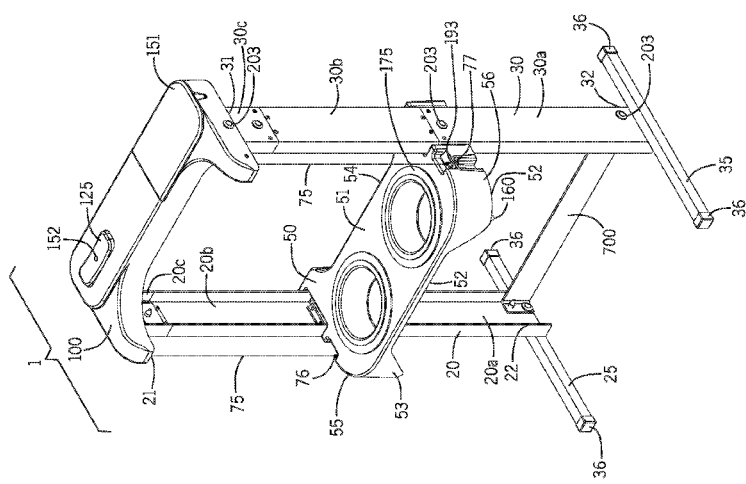
FIG. 1 is a system for providing nourishment to pets according to an example embodiment of the prior art.

The following detailed description refers to the accompanying drawings. Wherever possible, the same reference numbers are used in the drawings and the following description to refer to the same or similar elements. While embodiments herein may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The disclosed embodiments improve over the prior art by providing a system for providing nourishment to pets that simultaneously reduces aches and pains endured by the user from bending over to provide nourishment to their pets on the floor level, which is eliminated by the system providing a height adjustable platform preventing the user from having to bend over altogether. The disclosed embodiments are also directed to reducing complexities associated with owning and caring for pets due to the affixed and communicatively coupled computing device configured to perform and/or automate various tasks associated with the owning and caring for pets. The disclosed embodiments allow for automating the process of keeping track of the amount of food being eaten by the pet over time and provide advice on how much the pet should be eating currently and in the future. The disclosed embodiments further allow for easy and quick access to service providers for the pet, such as trainers, food delivery services, veterinarians, etc.

FIG. 1 is a system for providing nourishment to pets according to an example embodiment of the prior art. FIG. 1 shows that the prior art system includes a platform (for placing food/water bowls), that moves up and down on two vertical shafts. The claimed subject matter is a modification of the vertically moving platform for pets that is well known in the art. The prior art, however, does not address the issue of automated scaling and measurement of the amount of nourishment provided to pets along with computer-implemented processes associated with tasks inherent to owning and caring for pets.

Figure 2:
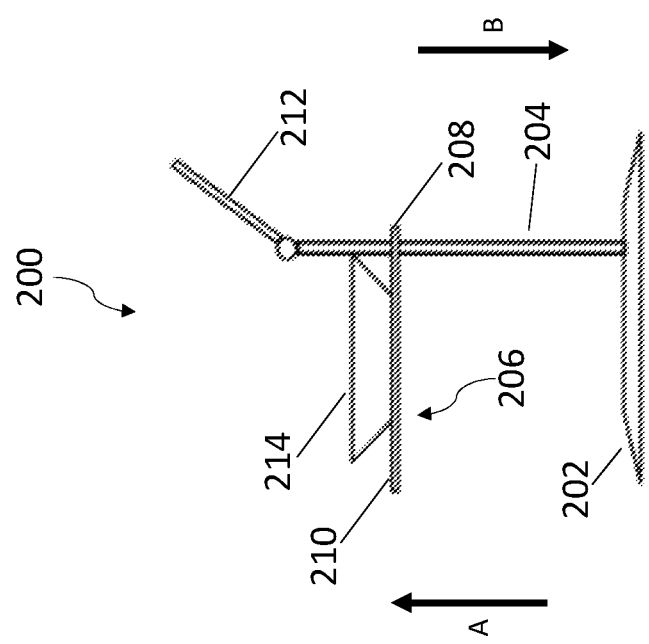
FIG. 2 is an example system for providing nourishment to pets in which the techniques described may be practiced according to certain embodiments.

FIG. 2 is a diagram of a system for providing nourishment to pets 200 in which the techniques described may be practiced according to certain embodiments. The system 200 includes a base 202 configured to serve as a foundational support for system 200, a shaft 204 affixed to base 202, a platform 206 integrated with shaft 204 configured to slide vertically along shaft 204, a motor 208 configured to power the vertical sliding of platform 206 along shaft 204, a scale 220 coupled to platform 206 configured to weigh items placed on the surface of platform 306, and a mount 212 affixed to shaft 204. In one embodiment, system 200 further includes one or more reservoirs 214 configured to house pet nourishment and be positioned on platform 206. Although only the shaft 204 is depicted, system 200 may include multiple shafts or vertical poles configured to be affixed to base 202 and integrated with platform 206, system 200 may include a plurality of any other component described herein. In one embodiment, shaft 204 may be affixed to base 202 via one or more screws, bolts, rivets, or any other applicable mechanism for affixing one component to another. In one embodiment, platform 206 may include one or more openings configured to allow the shaft 204 to integrate or penetrate seamlessly. The one or more openings may be sized adequately to allow tight retention to shaft 204 while allowing platform 206 to move in a first direction (as illustrated in FIG. 2 by line A) and a second direction (as illustrated in FIG. 2 by line B).

Platform 206 is electrically coupled to motor 208 which allows the platform 206 to move in the first and second directions. The power source of motor 208 may be a battery or any other applicable power source. In the present embodiment, the battery power source may be a battery power source, such as a standard dry cell battery commonly used in low-drain portable electronic devices (i.e., AAA batteries, AA batteries, etc.). Other types of batteries may be used including rechargeable batteries, aluminum air batteries, lithium batteries, paper batteries, lithium-ion polymer batteries, lithium iron phosphate batteries, magnesium iron batteries etc. Additionally, other types of battery applications may be used and are within the spirit and scope of the present invention. For example, a battery stripper pack may also be used. Additionally, other types of power sources may also be used and are within the spirit and scope of the present invention. Motor 208 may be positioned anywhere in system 200 that allows for placement of a sufficient power source and/or wiring configured to power motor 208. The motor may be activated by the computing device in a first mode, so as to move the slidable platform upwards along the vertical shaft, and may be activated by the computing device in a second mode, so as to move the slidable platform downwards along the vertical shaft. The motor may be deactivated by the computing device when the desired height of the platform has been reached.

In one embodiment, platform 206 may include one or more sensors configured to detect the presence of reservoir 214 and any other object placed on the surface. The one or more sensors may further be configured to collect data associated with weight, temperature, and any other applicable measurement. In one embodiment, platform 206 is configured to include one or more apertures sized to house reservoir 214. In one example, a rim of reservoir 214 may fill the aperture coming into contact with the surface of platform 206 while simultaneously allowing the body of reservoir 214 to suspend in the aperture; this configuration allows reservoir 214 to be positioned on platform 206 in a manner that prevents the pet from being able to knock over reservoir 214.

Figure 3:
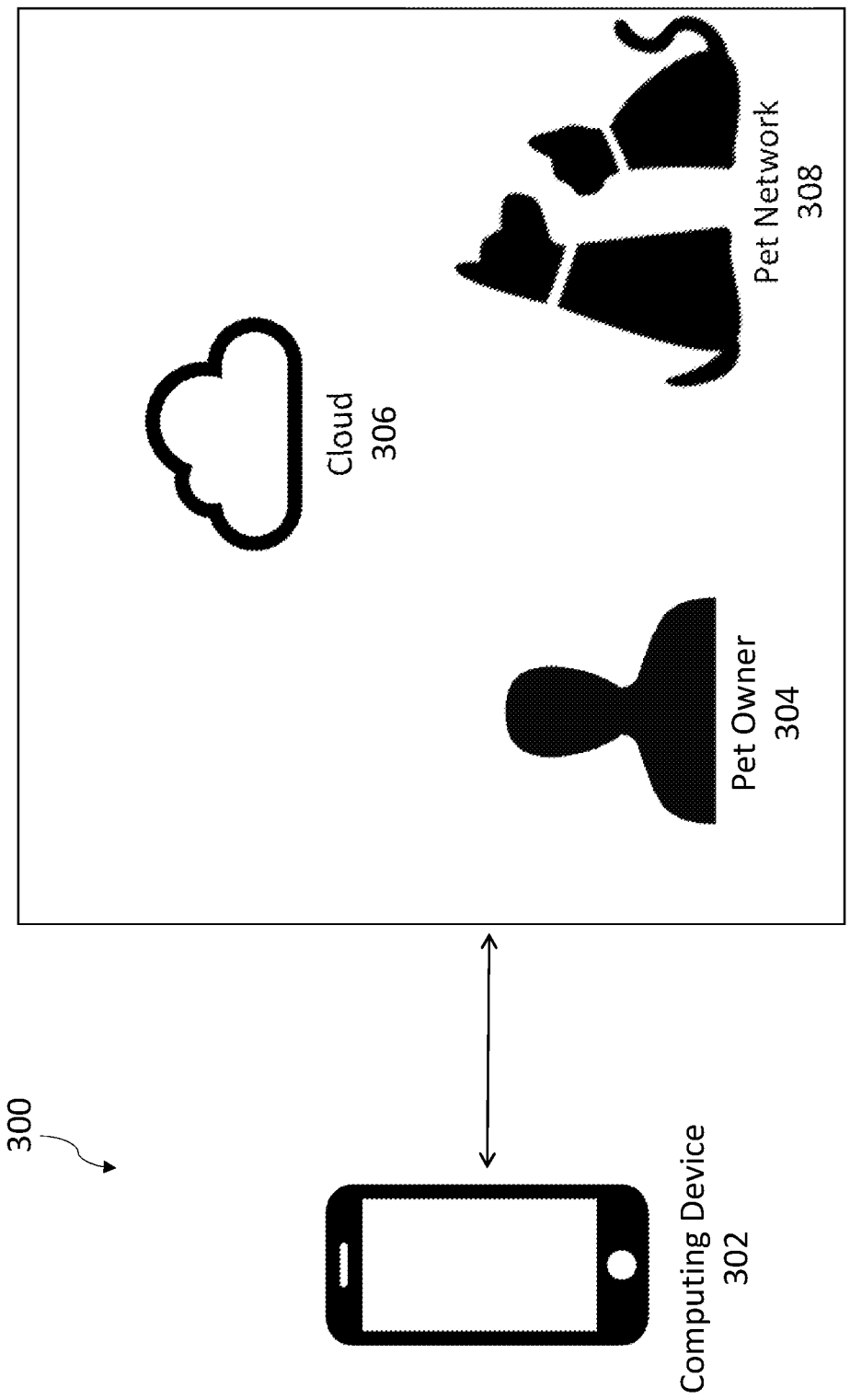
FIG. 3 is a block diagram that illustrates a network configured to communicate with the example system for providing nourishment to pets according to certain embodiments; and, FIG. 4 is a block diagram that illustrates a computer system upon which an embodiment of the invention may be implemented.

FIG. 3 is a diagram of a network 300 associated with the system for providing nourishment to pets 300 including a computing device 302 configured to be housed in mount 212, a pet owner 304 configured to be associated with computing device 302, a cloud network 306 configured to communicatively couple computing device 304 to a pet network 308.

Network 300 is a computer-based system. The various components of network 200 are implemented at least partially by hardware at one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. The descriptions of the components may be converted into software code, including code executable by an electronic processor. Network 300 illustrates only one of many possible arrangements of components configured to perform the functionality described herein. Other arrangements may include fewer or different components, and the division of work between the components may vary depending on the arrangement.

Examples of computing device 302 may include a computer, a tablet, a smartphone, and any other mechanism used to access networks and software. Computing device 302 may be affixed to mount 212 via magnets, screws, or any other applicable mechanism for physically and securely retaining a computing device. In one embodiment, computing device 302 is detachable from mount 212. Mount 212 is configured to allow the computing device to be coupled to the mount such that the mount holds the weight of the computing device, and such that the computing device is in a viewing position, such that the user standing in front of the claimed embodiment may easily view the display of the computing device. Computing device 302 may be configured to communicate with motor 208 allowing pet owner 304 to control movement of platform 206 in the first and second directions via one or more controls provided on the graphical user interface of computing device 302. In one embodiment, movement of platform 206 may occur automatically based on the pet nourishment in reservoir 214 reaching a threshold weight. Computing device 302 is further configured to communicate with the one or more sensors and receive sensor data collected by the one or more sensors and/or scale 220, and store the collected data in cloud 306 in order to allow pet owner 304 to view the weight of the amount of pet nourishment included in reservoir 214. The computing device 302 is configured to read weight data from the scale mechanism and store said weight data for later viewing or for viewing contemporaneously at the time the weight data is taken. The computing device 302 may displaying a history of past weight data from the scale mechanism, and may do so in calendar format, which is a format wherein a calendar is displayed and weight data is displayed in the calendar according to the date at which the weight data was taken.

Cloud 306 may further house any data associated with pet owner 304 and their pets including, but not limited to pet health records, pet shot records, pet recommended diet, and any other applicable information. Said data may be collected from pet owner 304, via computing device 302, or cloud 306 may collect data from any applicable internal or external networks associated with pet network 308. An example of software that executes on computing device 302 includes an app or service that is configured to communicate with a plurality of internal and/or external networks relating to owning and caring for pets, such as a service associated with pet network 308 that provides metrics, calendars, reminders, and other relevant information to pet owner 304 relating to owning and caring for their pets. Although only the pet network 308 is depicted, the pet network 308 may represent a plurality of internal and external networks associated with the pet services including, but not limited to, grooming services, veterinarian services/pet hospitals, pet food delivery services, pet medicine delivery services, dog walking services, trainer services, pet care databases, and the like. Pet owner 304 may provide information to computing device 302 or cloud 306 may provide data to pet network 308 relating to the type of pets pet owner 304 owns, the type of pet nourishment that is being provided to each respective pet, and any other applicable information. Based on the provided data, pet network 308 may generate metrics and/or provide pet owner 304 one or more suggestions and/or analyses relating to caring and owning pets. For example, pet network 308 may indicate that pet owner 304 is overfeeding their pet and suggest a desired amount of pet nourishment based on current daily weight of nourishment included in reservoir 214. In another example, pet network 308 may indicate that one or more pets are deficient in a specific vitamin based on the type and weight of nourishment housed in reservoir 214 and make a suggestion to pet owner 304 to include the specific vitamin in the diet of the pets.

Computer device 302 may be configured to process current and past weight data and provide advice on how much nourishment, by weight, should be fed to the pet currently or in the future. Computer device 302 may further be configured to provide an interface to allow a user to select a breed of the pet, a weight of the pet, medical history of the pet or medical ailments of the pet, as well as enter a current location. The computer device may process current and past weight data, the pet breed, the pet weight, the pet medical history and the pet medical ailments, and provide advice on how much nourishment, by weight, should be fed to the pet currently or in the future. The computer device may further provide an interface that provides a list of pet groomers, pet food delivery companies, pet veterinary service providers, pet walkers and pet trainers near the current location. The computing device may further be configured for providing an interface that displays reminders about vaccination shots and medical appointments for the pet, and reminders about medication for the pet, based on vaccination data, medical data and medication data entered by the user.

In one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
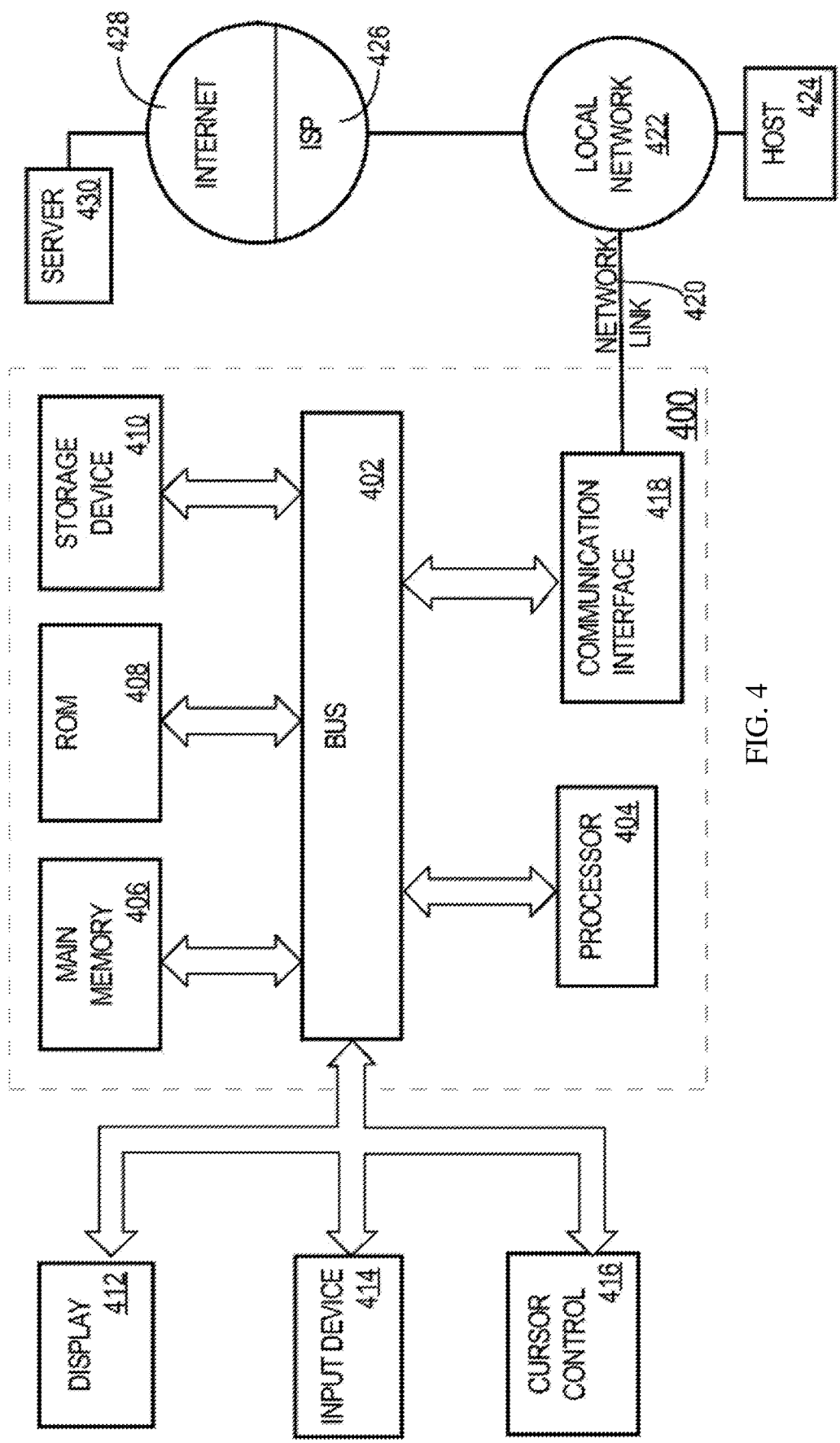

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 420, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 420. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 420. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 420 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 340 might transmit a requested code for an application program through Internet 428, ISP 426, local network 422 and communication interface 418.

The received code may be executed by processor 404 as it is received, and/or stored in storage device 420, or other non-volatile storage for later execution.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for providing nourishment to pets, the system comprising:
    a base component configured to provide a foundation;
    at least one vertical shaft affixed to the base component;
    a slidable platform coupled to the at least one vertical shaft;
    at least one reservoir configured to be positioned on the slidable platform, the at least one reservoir for holding nourishment for a pet;

a motor configured to power vertical movement of the slidable platform along the vertical shaft;

a scale mechanism configured for weighing the nourishment in the at least one reservoir, thereby producing weight data for the nourishment;

a computing device communicatively coupled to the motor and the scale mechanism, wherein the computing device is configured to read weight data from the scale mechanism and store said weight data, and wherein the computing device is configured to activate and deactivate the motor, so as to move the slidable platform along the vertical shaft; and a mount affixed to the at least one vertical shaft, the mount configured to couple to the computing device in a viewing position.

2. The system of claim 1, wherein the computing device is further configured for displaying the weight data from the scale mechanism.

3. The system of claim 2, wherein the computing device is further configured for displaying a history of past weight data from the scale mechanism.

4. The system of claim 3, wherein the computing device is further configured for processing current and past weight data and providing advice on how much nourishment, by weight, should be fed to the pet currently.

5. The system of claim 3, wherein the computing device is further configured for processing current and past weight data and providing advice on how much nourishment, by weight, should be fed to the pet in the future.

6. The system of claim 3, wherein the computing device is further configured for providing an interface to allow a user to select a breed of the pet, processing current and past weight data and providing advice on how much nourishment, by weight, should be fed to the pet currently, according the breed that was selected.

7. The system of claim 3, wherein the computing device is configured for providing an interface to allow a user to enter a current location and providing a list of pet groomers near the current location.

8. The system of claim 3, wherein the computing device is configured for providing an interface to allow a user to enter a current location and providing a list of pet food delivery companies near the current location.

9. The system of claim 3, wherein the computing device is configured for providing an interface to allow a user to enter a current location and providing a list of pet veterinary service providers near the current location.

10. The system of claim 3, wherein the computing device is configured for providing an interface to allow a user to enter a current location and providing a list of pet walkers and pet trainers near the current location.

11. The system of claim 3, wherein the computing device is configured for providing an interface that displays reminders about vaccination shots and medical appointments for the pet.

12. The system of claim 3, wherein the computing device is configured for providing an interface that displays reminders about medication for the pet.

13. The system of claim 2, wherein the computing device is further configured for displaying a history of past weight data from the scale mechanism in a calendar format.

14. A system for providing nourishment to pets, the system comprising:

a base component configured to provide a foundation;

at least one vertical shaft affixed to the base component;

a slidable platform coupled to the at least one vertical shaft;

at least one reservoir configured to be positioned on the slidable platform, the at least one reservoir for holding nourishment for a pet;

a motor configured to power vertical movement of the slidable platform along the vertical shaft;

a scale mechanism configured for weighing the nourishment in the at least one reservoir, thereby producing weight data for the nourishment;

a computing device communicatively coupled to the motor and the scale mechanism, wherein the computing device is configured to:

a) read weight data from the scale mechanism;

b) store said weight data;

c) activate the motor in a first mode, so as to move the slidable platform upwards along the vertical shaft;

d) activate the motor in a second mode, so as to move the slidable platform downwards along the vertical shaft; and e) deactivate the motor when the slidable platform has reached the desired height;

a mount affixed to the at least one vertical shaft, the mount configured to couple to the computing device in a viewing position.

15. The system of claim 14, wherein the computing device is further configured for displaying the weight data from the scale mechanism.

16. The system of claim 15, wherein the computing device is further configured for displaying a history of past weight data from the scale mechanism.

* * * * *